April 5, 1960 B. BRIGHTMAN 2,932,005

ELECTRONIC SWITCHING SYSTEM COMMON CONTROL EQUIPMENT

Filed June 23, 1958 3 Sheets-Sheet 1

INVENTOR,
BARRIE BRIGHTMAN

BY F. H. Henson

ATTORNEY

United States Patent Office 2,932,005
Patented Apr. 5, 1960

2,932,005

ELECTRONIC SWITCHING SYSTEM COMMON CONTROL EQUIPMENT

Barrie Brightman, Rochester, N.Y., assignor to General Dynamics Corporation, Rochester, N.Y., a corporation of Delaware Application June 23, 1958, Serial No. 743,640

19 Claims. (Cl. 340—147)

Figure 1:
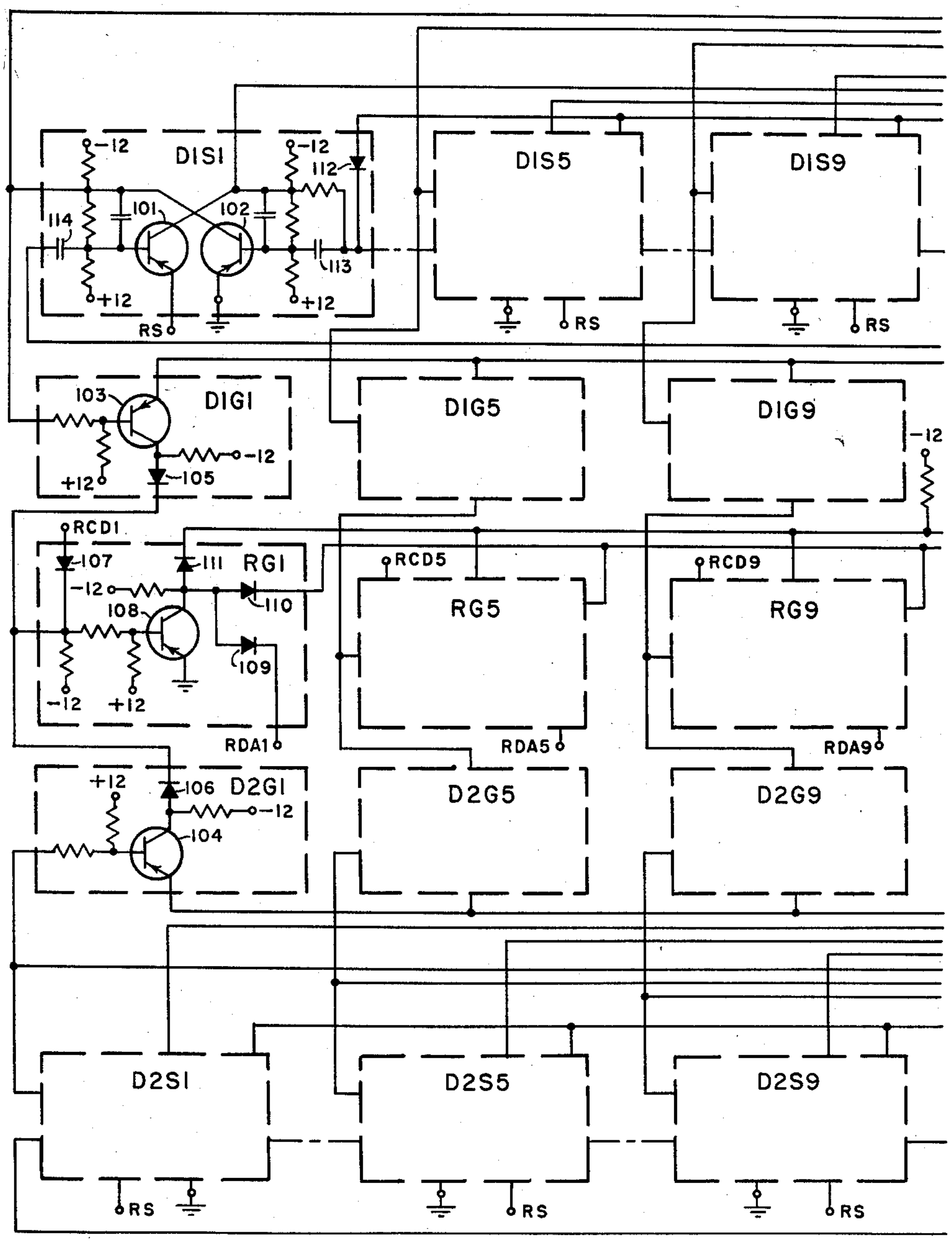

This invention relates in general to electronic switching systems and, more particularly, to common equipment for controlling operation of electronic switching systems.

Electronic counters, which may be either of the ring or binary chain type, are used extensively as distributors or pulse commutators in electronic switching systems. In some time division multiplex system applications, an electronic counter is continuously stepped under control of a master oscillator and the output signals appearing on the output conductors individually corresponding to the settings of the counter are used to define individual time positions which recur in repetitive time position frames. In other applications, an electronic counter is used to control the assignment of individual circuits, such as calling line finders or registers in electronic switching telephone systems, for use in turn by the application of mark signals to conductors individual to those circuits. Regardless of the application, there is usually only one electronic counter provided to perform a particular function in an electronic switching system and if that counter should fail, the result is catastrophic. Some electronic switching systems of the prior art provide standby equipment for common control circuits, but to my knowledge, none of these systems are capable of switching standby equipment into use without interfering with connections being established or connections already established.

Accordingly, it is a general object of this invention to provide a new and improved electronic switching system.

It is a more particular object of this invention to provide new and improved circuitry for automatically switching standby common control equipment into use upon the failure of the regular common control equipment provided in an electronic switching system.

In accordance with this invention, the regular and standby electronic counters are driven from the same source of input pulses and are thus controlled to normally advance in synchronism, the settings of the counters are continuously compared, an alarm is given if the count in the regular counter exceeds the count in the standby counter, and transfer is made to the standby counter if the count in the standby counter exceeds the count in the regular counter. The comparison of the settings of the counters is performed by three control gates, regardless of the number of stages exceeding three in the counters, which individually check the output of corresponding stages in the regular and standby counters. Each of the control gates functions to apply a control signal to a first conductor when the regular counter stage corresponding to that gate is in an indicating condition and the standby counter stage corresponding to that gate is in a non-indicating condition, and to apply a control signal to a second conductor when the standby counter stage corresponding to that gate is in an indicating condition and the regular counter stage corresponding to that gate is in a non-indicating condition. If two control signals are successively applied to the first conductor, thus indicating that the standby counter has failed, an alarm is given. If two control signals are successively applied to the second conductor, thus indicating that the regular counter has failed, transfer is made to the standy counter. Thus, the control gates which compare the settings of the counters not only indicate that a counter has failed, but also indicate which one of the counters has failed.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise three figures on three sheets and which should be arranged in numerical order from left to right to show the invention.

The invention has been disclosed as embodied in a register finder for use in an electronic switching telephone system of the type shown and described in detail in copending application, Serial No. 721,241, filed March 13, 1958, and assigned to the same assignee as the present invention. As fully described in the above-identified copending application, each incoming register or register sender which is in condition to read out stored information, for the purpose of completing a call, forwards a connect demand signal to the register finder over an individual demand conductor, such as register connect demand conductors RCD1—RCDN of Figs. 1 and 2. The register finder enables the registers in turn to read out stored information by the application of a register demand answer signal to the individual conductors, such as RDA1—RDAN of Figs. 1 and 2, corresponding to registers demanding connection.

Figure 3:
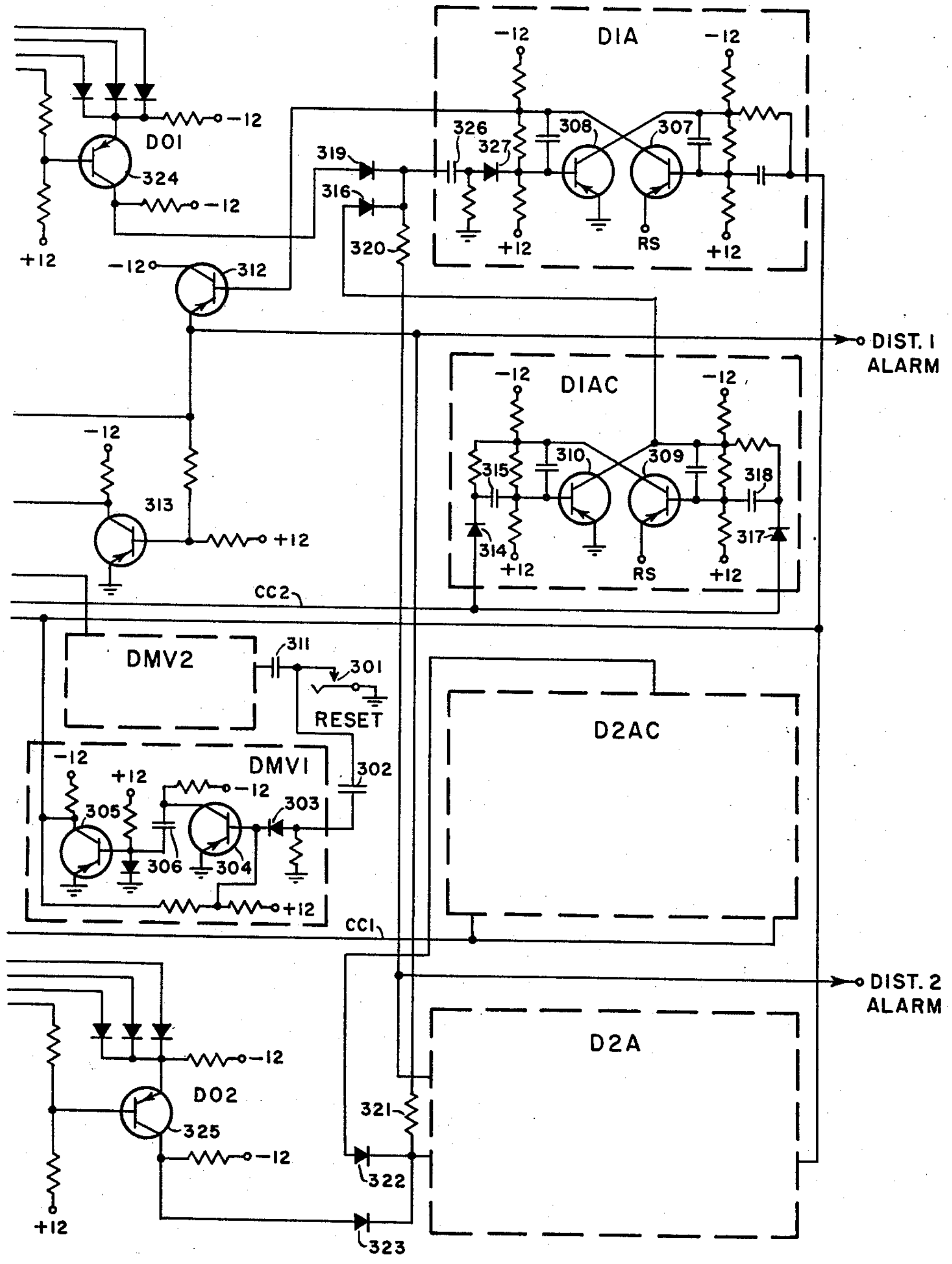

When the illustrated circuit is first placed in operation, reset key 301 of Fig. 3 is momentarily operated to apply a positive-going potential pulse through capacitor 302 and diode 303 to the base of transistor 304 in the twenty microsecond delay multivibrator, labeled DMV1. Transistors 304 and 305 comprise a monostable circuit in which transistor 304 is normally conductive and transistor 305 is normally non-conductive. When a positive pulse is coupled to the base of transistor 304, transistor 304 is rendered non-conductive and transistor 305 is triggered conductive to hold transistor 304 non-conductive for the charge time of capacitor 306. Since the circuit reverts to its normal condition after approximately twenty microseconds, a twenty microsecond ground pulse appears at the collector of transistor 305 and is coupled through diode 201 to render normally conductive transistor 202 non-conductive and thus apply a negative pulse to reset conductor RS. The negative pulse on conductor RS is applied to the emitter electrode of transistor 101 in the first flip-flop stage of the first distributor or electronic counter, to the emitter electrode of the transistor corresponding to transistor 101 in the first stage D2S1 of the second distributor, and to the emitter electrode of the transistor corresponding to transistor 102 in each of the remaining stages of the first and second distributors. Thus, responsive to the momentary operation of reset key 301, the first and second distributors are each set to the condition in which transistor 102 in the first stage is conductive and the transistor corresponding to 101 in each of the remaining stages is conductive.

The negative pulse applied to conductor RS at the collector of transistor 202 is also coupled to the emitter of transistor 307 in the first distributor alarm flip-flop circuit and to the emitter of a transistor corresponding to 307 in the second distributor alarm circuit D2A to set those flip-flop circuits to the condition in which transistor 308 is conductive. The negative pulse on conductor RS is also applied to the emitter of transistor 309 in the first distributor alarm control flip-flop circuit and to the emitter of the transistor corresponding to 309 in the second distributor alarm control circuit D2AC to set those flip-flop circuits to the condition in which transistor 310 is conductive. It is to be noted that the delay multivibrator, labeled DMV2, is triggered through capacitor 311 when reset key 301 is momentarily operated. DMV2 is identical to previously described circuit DMV1 except that it is designed to provide a one hundred microsecond output pulse. The output pulse from circuit DMV2 is coupled through diodes 203 and 204 to the base electrodes of transistors 205 and 206, respectively, to prevent the operation of those transistors while the circuits are being reset.

When the illustrated circuit is in the reset condition, negative potential appears at the emitter of emitter follower transistor 312, since transistor 307 is non-conductive, and transistor 207 is held conductive to thereby apply ground potential to the emitter electrode of the transistor 103 in each of the first distributor gates D1G1—D1GN. As will be described more fully hereinafter, the application of ground potential to the emitters of the transistors 103 enables these gating transistors to couple output signals from the first or regular distributor to the output signal utilization circuit comprising register gates RG1—RGN. The negative potential normally appearing at the emitter of emitter follower transistor 312 holds transistor 313 conductive and transistor 208 non-conductive to thereby apply negative potential to the emitter of the transistor corresponding to 104 in each of the second distributor gates D2G1—D2GN. The application of negative potential to the emitters of the transistors 104 disables these gating transistors so that a negative signal appears at the collector of each transistor 104 regardless of the setting of the second or standby distributor.

With the first distributor in the setting in which transistor 102 of the first stage is conductive, and the transistor corresponding to transistor 101 in each of the remaining stages is conductive, gate D1G1 transistor 103 is held non-conductive and the transistor corresponding to 103 in each of the remaining first distributor gating stages is held conductive. Under these conditions, negative potential is applied to the anode terminal of diode 105 in stage D1G1 while ground potential is applied to the anode terminal of the diode corresponding to 105 in each of the remaining first distributor gating stages.

Each register gating stage comprises a three-input AND gate for negative signals. For example, register gating stage RG1 comprises diodes 105, 106, and 107. If it is assumed that the first register is demanding service at this time, as denoted by the application of negative potential to conductor RCD1, all inputs to the gate are negative and transistor 108 in stage RG1 is rendered conductive. The transistor corresponding to 108 in each of the remaining register gates is, of course, held non-conductive by ground potential coupled through the diode corresponding to 105 in the stages D1G2—D1GN.

When transistor 108 in stage RG1 is conductive, the ground potential appearing at its collector is applied through diode 109 to the register demand answer conductor RDA1 to enable the first register to read out stored information, as fully described in the above-identified application. Ground potential appearing at the collector of transistor 108 in stage RG1 is also coupled through diode 110 to the found register conductor FR as an indication to the other circuits provided in the system that a register has been enabled for operation. Ground potential appearing at the collector of conducting transistor 108 in stage RG1 is also coupled through diode 111 to the base electrodes of transistors 205 and 206. Ground potential applied to the base electrodes of transistors 205 and 206 through a diode corresponding to 111 in any one of the register gating stages is effective to prevent these transistors from being rendered conductive by negative pulses applied to conductor 20 KC trigger by any suitable common source of input pulses.

The illustrated circuit remains in the just described condition until the first register completes the reading out of stored information. At that time, conductor RCD1 returns to ground potential and transistor 108 in stage RG1 becomes non-conductive to remove ground potential from conductors RDA1 and FR and from the base electrodes of transistors 205 and 206. The next occurring negative clock pulse on conductor 20 KC trigger renders transistors 205 and 206 conductive. The positive-going pulse appearing at the collector of transistor 205 is coupled to the anode terminal of a diode corresponding to 112 in each stage of the first distributor and the positive-going pulse at the collector of transistor 206 is coupled to the anode terminal of a diode corresponding to 112 in each stage of the second distributor. In stage D1S1, a positive-going pulse is coupled through diode 112 and capacitor 113 to the base of transistor 102 and serves to trigger transistor 102 non-conductive and transistor 101 conductive. The positive-going pulse coupled through diode 112 is also coupled through a capacitor corresponding to capacitor 114 to the base of the transistor corresponding to 101 in the second stage of the first distributor and serves to trigger that stage to the condition wherein transistor 102 is conductive and transistor 101 is non-conductive. The positive-going pulse applied to the anode terminal of the diode corresponding to 112 in each of the remaining first distributor stages has no effect on those stages since the cathode terminal of diode 112 in each of those stages is returned to ground potential at the collector of the conducting transistor 101 in each of those stages. The operation in the second distributor is, of course, identical to the operation just described for the first distributor. Thus, both the first and second distributors advance to the second step and if the second register is in readiness to read out, the transistor corresponding to 108 in register gate RG2 becomes conductive and ground potential is applied to conductors RDA2 and FR and to the base electrodes of transistors 205 and 206. If the second register is not in readiness to read out and ground potential therefore appears on conductor RCD2, the transistor corresponding to 108 in stage RG2 remains non-conductive and drive transistors 205 and 206 become conductive during the next occurring 20 kc. clock pulse to advance the first and second distributors to their third steps. If none of the registers are demanding attention for read out purposes, the distributors are controlled to continuously advance in synchronism at a 20 kc. rate. It can be seen that under normal operating conditions the first and second distributors remain in synchronism and the output signals from the first distributor control the assignment of the registers for use.

Figure 2:
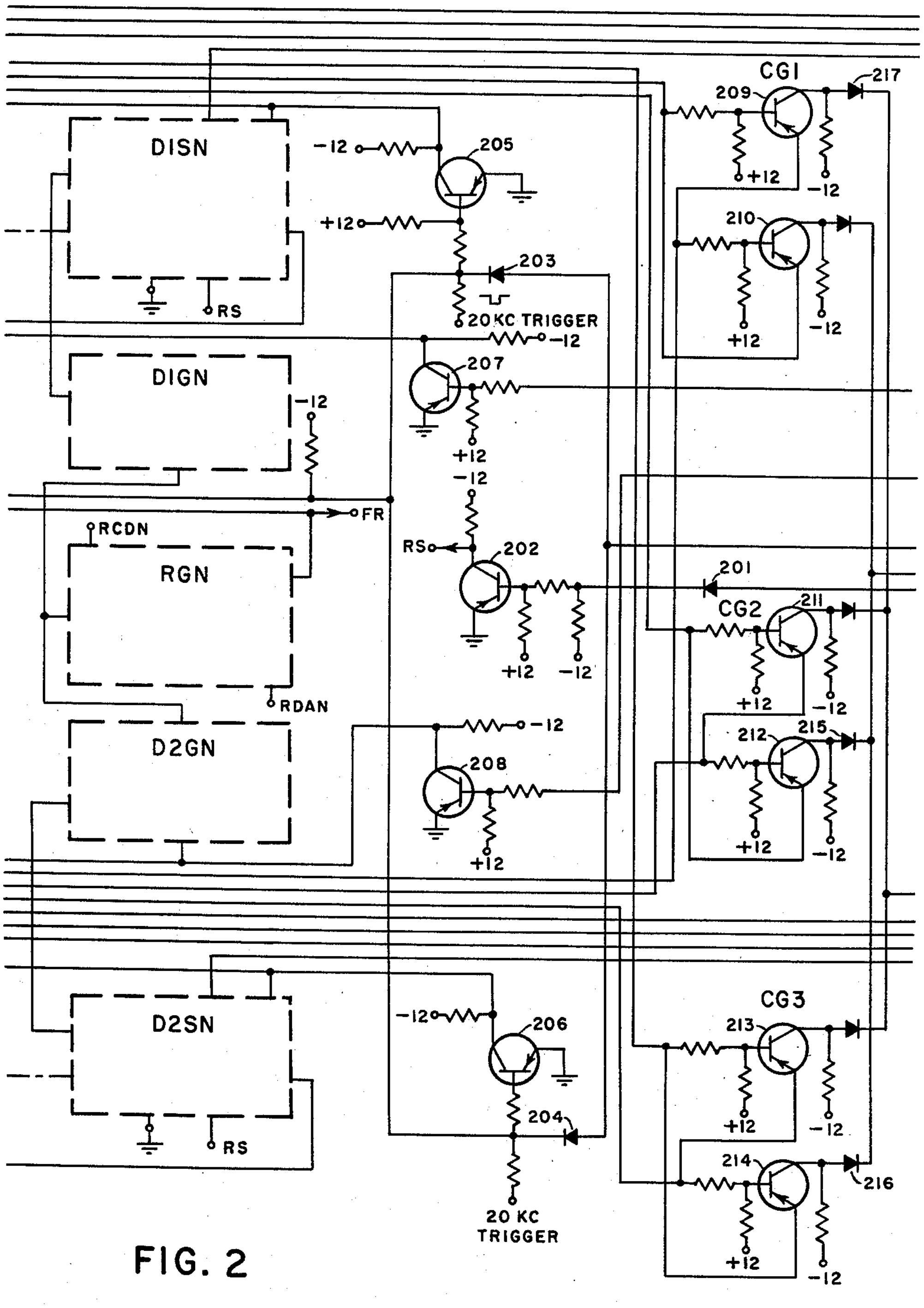

Three control gates, identified as CG1, CG2, and CG3 in Fig. 2 of the drawings, are provided in the illustrated system for the purpose of comparing the settings of the first and second distributors at various stages in each cycle of operation of the distributors. As illustrated, the operation of the first control gate comprising transistors 209 and 210 is controlled by the first stages of the first and second distributors since the base of transistor 209 and the emitter of transistor 210 are returned to the collector of transistor 101 in stage D1S1, while the base of transistor 210 and the emitter of transistor 209 are returned to the collector of the transistor corresponding to transistor 101 in stage D2S1. Similarly, the base of transistor 211 and the emitter of transistor 212 of control gate 2 are returned to the collector of the transistor corresponding to 101 in stage D1S5, while the base of transistor 212 and the emitter of transistor 211 are returned to the collector of the transistor corresponding to 101 in stage D2S5 and the base of transistor 213 and the emitter of transistor 214 of the third control gate are returned to the collector of transistor 101 in stage D1S9, while the base of transistor 214 and the emitter of transistor 213 are returned to the collector of transistor 101 in stage D2S9. It is emphasized that only three control gates are required to detect the failure and to identify the failing circuit regardless of the number of stages in the distributors.

When the distributors are operated in synchronism, no output is realized from the control gates since the base and emitter electrodes of both transistors comprising the gate are either at ground or negative potential. For example, it can be seen that when the first stage flip-flop circuits of both distributors are in an indicating condition and transistors 101 are therefore non-conductive, negative potential is applied to the base and emitter electrodes of transistors 209 and 210. Similarly, when the first stage flip-flop circuits of both distributors are in a non-indicating condition and transistors 101 are therefore conductive, ground potential is applied to the base and emitter electrodes of transistors 209 and 210.

To illustrate the operation of the control gates, first assume that the first distributor fails on the second step and therefore remains in that setting while the second distributor continues to advance. When the second distributor reaches the fifth step and the transistor corresponding to 101 in stage D2S5 becomes non-conductive, negative potential is applied to the base of transistor 212 and to the emitter of transistor 211. Since the first distributor is assumed to be on the second step and the transistor corresponding to 101 in stage D1S5 is therefore conductive, ground potential is applied to the base of transistor 211 and to the emitter of transistor 212. Transistor 212, therefore, becomes conductive and a ground potential control signal is applied through diode 215 to the second control conductor CC2. The positive-going potential swing on conductor CC2 is coupled through steering diode 314 and capacitor 315 to trigger the first distributor alarm control flip-flop circuit to the condition in which transistor 310 is non-conductive and transistor 309 is conductive. When transistor 310 becomes non-conductive, negative potential appears at its collector but without effect on the first distributor alarm flip-flop circuit D1A since diode 316 is poled in the reverse direction for negative signals. When the second distributor advances to its sixth step, transistor 212 becomes non-conductive and ground potential is removed from control conductor CC2. When the second distributor advances to the ninth step, transistor 214 is rendered conductive and a ground potential control signal is coupled through diode 216 to the second control conductor CC2 and the first distributor alarm control flip-flop circuit is reset through steering diode 317 and capacitor 318. When transistor 310 again becomes conductive, the output of the OR gate for positive signals, comprising diodes 316 and 319 and resistor 320, goes positive and flip-flop circuit D1A is triggered through capacitor 326 and diode 327 to the condition in which transistor 308 is non-conductive and transistor 307 is conductive. When transistor 307 becomes conductive, the emitter of emitter follower transistor 312 goes to ground, transistor 207 becomes non-conductive to disable the first distributor gating transistors 103, transistor 313 becomes non-conductive and transistor 208 becomes conductive to apply ground potential to the emitter electrodes of the second distributor gating transistors 104. Thus, responsive to the successive application of two control signals to the second control conductor CC2, transfer is made from the first distributor to the second distributor. Ground potential appearing at the emitter of emitter follower transistor 312 is also applied to the first distributor alarm conductor and may be used to energize any suitable alarm device to indicate that the first distributor has failed.

To illustrate the necessity for providing three control gates, next assume that the first distributor fails on the first step. When the second distributor advances to the second step, the base of transistor 210 and the emitter of transistor 209 are returned to ground potential but since the first distributor remains on the first step, the base of transistor 209 and the emitter of transistor 210 remain at negative potential and transistor 209 becomes conductive. When transistor 209 becomes conductive, the ground potential control signal is coupled through diode 217 to the first control conductor CC1 and the second distributor alarm control flip-flop circuit D2AC is triggered to the condition in which the transistor corresponding to 310 therein becomes non-conductive. Thus, a false indication that the second distributor has failed is registered when the first distributor stops on one of the checked steps. When the second distributor reaches the fifth step, transistor 212 becomes conductive and the first distributor alarm control flip-flop circuit D1AC is triggered to the condition in which transistor 310 is non-conductive. When the second distributor reaches the ninth step, transistor 214 becomes conductive, the first distributor alarm control flip-flop circuit is triggered to initiate the transfer to the second distributor and to energize the first distributor alarm, all as previously described. Thus, responsive to the successive application of two control signals to conductor CC2, transfer is made from the first distributor to the second distributor. It should be obvious that if only two control gates were provided in the system, a false indication that the second distributor is faulty would be given under the above-described conditions. To review, ground is applied to conductor CC1 when the second distributor advances off the first step and ground potential is applied to conductor CC2 when the second distributor advances to the fifth stage. Now, assuming that only two control gates are provided, when the second distributor again reaches the first step, ground is removed from conductor CC1 and when the second distributor advances off the first step, ground is reapplied to conductor CC1. Under these conditions, two control signals are applied to conductor CC1 before two control signals are applied to conductor CC2 and a false indication that the second distributor is faulty is given. It is to be noted that when transistor 307 of the first distributor alarm flip-flop circuit becomes conductive and the emitter of emitter follower transistor 312 goes to ground potential, ground potential is applied through large-valued resistor 321 to the output of the OR gate for positive signals, comprising diodes 322 and 323 and resistor 321. Thus, the output of said gate is clamped at ground potential to prevent the operation of the second distributor alarm flip-flop circuit D2A regardless of the number of pulses thereafter applied to the first control conductor CC1.

If the second distributor fails to advance, two ground potential control signals are successively applied to the first control conductor CC1, the flip-flop circuit D2AC is operated and reset, and the second distributor alarm flip-flop circuit D2A is triggered to apply ground potential to the second distributor alarm conductor. Ground potential is also coupled through resistor 320 to the output of the OR gate for positive signals, comprising diodes 316 and 319 and resistor 320, to prevent operation of the flip-flop circuit D1A regardless of the number of pulses thereafter applied to conductor CC2. Thus, an alarm is given when the second or standby distributor fails even though the second distributor is not in use at that time.

Dual operate transistors 324 and 325 are provided in the circuit for the purpose of triggering the flip-flop circuits D1A and D2A, respectively, in the event that two or more stages in either distributor are simultaneously in the indicating condition. The base of dual operate transistors 324 is returned to the collector of the transistor corresponding to 101 in the final stage of the first distributor and the emitter of transistor 324 is returned through individual diodes to the collector of the transistor corresponding to 102 in each of the remaining stages of the first distributor. Under normal operating conditions, the transistor corresponding to 102 in each stage but the final stage of the first distributor is non-conductive when the transistor corresponding to 101 in the final stage is non-conductive and both the base and emitter of transistor 324 are returned to negative potential. If, however, one of the other stages is in the indicating condition when the final stage is in the indicating condition, ground potential is applied to the emitter of transistor 324 and transistor 324 is rendered conductive. When transistor 324 becomes conductive, the positive-going potential swing at its collector is coupled through diode 319, capacitor 326, and diode 327 to trigger the first distributor alarm flip-flop circuit to the condition in which transistor 307 is conductive. When transistor 307 becomes conductive, transfer is made to the second distributor and an alarm is given, as previously described. Similarly, a dual operation in the second distributor serves to render transistor 325 conductive and thus trigger flip-flop circuit D2A to initiate an alarm, as previously described.

As previously described, the first and second distributors are reset to the first step and the distributor alarm control and distributor alarm flip-flop are all restored to their normal condition when the reset key 301 is operated.

While there has been shown and described what is at present considered to be the preferred embodiment of the invention, modifications thereto will readily occur to those skilled in the art. It is not, therefore, desired that the invention be limited to the embodiment shown and described, and it is intended to cover in the appended claims all such modifications as fall within the true spirit and scope of the invention.

What is claimed is:

1. In combination, regular means for generating control signals, standby means for generating control signals, a control signal utilization circuit, an alarm circuit, means for normally operating both said regular and standby means to generate control signals, means for normally coupling the control signals generated by said regular means to said utilization circuit, means for energizing said alarm circuit responsive to the failure of said standby means to generate control signals, and means for coupling the control signals generated by said standby means to said utilization circuit responsive to the failure of said regular means to generate control signals.

2. The combination of claim 1 including a second alarm circuit, and means for energizing said second alarm circuit responsive to the failure of said regular means to generate control signals.

3. In combination, first and second pulse-operated counting chains, a source of input pulses, an output signal utilization circuit, an alarm circuit, means for coupling input pulses from said source to both said first and second counting chains to thereby normally advance said counting chains in synchronism, means for normally coupling output signals from said first counting chain to said utilization circuit, means for energizing said alarm circuit responsive to the failure of said second counting chain to advance upon the receipt of input pulses, and means for coupling output signals from said second counting chain to said utilization circuit responsive to the failure of said first counting chain to advance upon the receipt of input pulses.

4. The combination of claim 3 including a second alarm circuit, and means for energizing said second alarm circuit responsive to the failure of said first counting chain to advance upon the receipt of input pulses.

5. In combination, first and second pulse-operated counting chains, a source of input pulses, means for coupling input pulses from said source to both said first and second counting chains to thereby normally advance said counting chains in synchronism, first and second pluralities of output conductors associated with said first and second counting chains, respectively, means in each of said counting chains for applying an output signal to each of its associated output conductors in turn as the setting of that counting chain is advanced, a third plurality of output conductors, a plurality of first gating means interposed in individual connections between the conductors of said plurality of conductors and the conductors of said third plurality of conductors, a plurality of second gating means interposed in individual connections between the conductors of said second plurality of conductors and the conductors of said third plurality of conductors, means for normally controlling said first and second gating means to couple output signals appearing on said first plurality of conductors to said third plurality of conductors and to block output signals appearing on said second plurality of conductors from said third plurality of conductors, respectively, and means for controlling said first and second gating means to block output signals appearing on said first plurality of conductors from said third plurality of conductors and to couple output signals appearing on said second plurality of conductors to said third plurality of conductors, respectively, responsive to the failure of said first counting chain to advance upon the receipt of input pulses.

6. The combination of claim 5 including first and second alarm circuits, means for energizing said first alarm circuit responsive to the failure of said first counting chain to advance upon the receipt of input pulses, and means for energizing said second alarm circuit responsive to the failure of said second counting chain to advance upon the receipt of input pulses.

7. In combination, first and second pulse-operated counting chains, a source of input pulses, means for coupling input pulses from said source to both said first and second counting chains to thereby normally advance said counting chains in synchronism, at least first, second, and third output conductors associated with each counting chain, means in each of said counting chains for applying an output signal to each of its associated output conductors in turn as the setting of that counting chain is advanced, an output signal utilization circuit, means for normally connecting the output conductors associated with said first counting chain to said utilization circuit, first and second control conductors, first, second, and third control gates corresponding to said first, second, and third output conductors, respectively, means in each of said gates for applying a control signal to said first control conductor when an output signal appears on the first counting chain output conductor corresponding to that gate and no output signal appears on the second counting chain output conductor corresponding to that gate and for applying a control signal to said second control conductor when an output signal appears on the second counting chain output conductor corresponding to that gate and no output signal appears on the first counting chain output conductor corresponding to that gate, and transfer means responsive to the successive application of two control signals to said second control conductor for connecting the output conductors associated with said second counting chain to said utilization circuit.

8. The combination of claim 7 including an alarm circuit, and means also responsive to the successive application of two control signals to said second control conductor for energizing said alarm circuit.

9. The combination of claim 7 including means responsive to the successive application of two control signals to said first control conductor for preventing the operation of said transfer means regardless of the number of control signals thereafter appearing on said second control conductor.

10. In combination, first and second pulse-operated counting chains, a source of input pulses, an output signal utilization circuit, means for coupling input pulses from said source to both said first and second counting chains to thereby normally advance said counting chains in synchronism, transfer means for coupling output signals from said first counting chain to said utilization circuit when in a normal unoperated condition and for coupling output signals from said second counting chain to said utilization circuit when in an operated condition, means for comparing the setting of said first and second counting chains, and means for operating said transfer means when the count in said second counting chain exceeds the count in said first counting chain.

11. The combination of claim 10 including an alarm circuit, and means for energizing said alarm circuit when the count in said first counting chain exceeds the count in said second counting chain.

12. The combination of claim 10 including resetting means, means for operating said resetting means, means responsive to the operation of said resetting means for resetting said first and second counting chains to the same setting, and means also responsive to the operation of said resetting means for restoring said transfer means to its normal unoperated condition.

13. In combination, first and second pulse-operated counting chains each having at least first, second, and third stages, each of said counting chains being of the type in which one stage is in an indicating condition and the remaining stages are in a non-indicating condition at any given time and the operation is advanced from stage to stage responsive to the receipt of input pulses, a source of input pulses, means for coupling input pulses from said source to both said first and second counting chains to thereby normally advance said chains in synchronism, first and second control conductors, first, second, and third control gates corresponding to said first, second, and third counting chain stages, respectively, means in each of said gates for applying a control signal to said first conductor when the first counting chain stage corresponding to that gate is in an indicating condition and the second counting chain stage corresponding to that gate is in a non-indicating condition, means in each of said gates for applying a control signal to said second conductor when the second counting chain stage corresponding to that gate is in an indicating condition and the first counting chain stage corresponding to that gate is in a non-indicating condition, an alarm circuit, and means responsive to the successive application of two control signals to said second conductor for energizing said alarm circuit.

14. The combination of claim 13 including a second alarm circuit, and means responsive to the successive application of two control signals to said first conductor for energizing said second alarm circuit.

15. In combination, first and second pulse-operated counting chains each comprising at least first, second, and third stages, each of said counting chains being of the type in which one stage is in an indicating condition and the remaining stages are in a non-indicating condition at any given time and the operation is advanced from stage to stage by the application of input pulses to the counting chain, a source of input pulses, means for coupling input pulses from said source to both of said counting chains to thereby normally advance said chains in synchronism, an output signal utilization circuit, means for normally coupling the output signals from said first counting chain to said utilization circuit, first and second control conductors, first, second, and third control gates corresponding to said first, second, and third stages, respectively, means in each of said gates for applying a control signal to said first conductor when the first counting chain stage corresponding to that gate is in an indicating condition and the second counting chain stage corresponding to that gate is in a non-indicating condition, means in each of said gates for applying a control signal to said second conductor when the second counting chain stage corresponding to that gate is in an indicating condition and the first counting chain stage corresponding to that gate is in a non-indicating condition, and means responsive to the successive application of two control signals to said second conductor for coupling the output signals from said second counting chain to said utilization circuit.

16. The combination of claim 15 including an alarm circuit, and means responsive to the successive application of two control signals to said first conductor for energizing said alarm circuit.

17. In combination, first and second pulse-operated counting chains each comprising at least first, second, and third stages, each of said counting chains being of the type in which one stage is in an indicating condition and the remaining stages are in a non-indicating condition at any given time and the operation is advanced from stage to stage by the application of input pulses to the counting chain, a source of input pulses, means for coupling input pulses from said source to both of said counting chains to thereby normally advance said chains in synchronism, an output signal utilization circuit, transfer means for coupling output signals from said first counting chain to said utilization circuit when in a normal unoperated condition and for coupling output signals from said second counting chain to said utilization circuit when in an operated condition, first and second control conductors, first, second, and third control gates corresponding to said first, second, and third stages, respectively, means in each of said gates for applying a control signal to said first conductor when the first counting chain stage corresponding to that gate is in an indicating condition and the second counting chain stage corresponding to that gate is in a non-indicating condition, means in each of said gates for applying a control signal to said second conductor when the second counting chain stage corresponding to that gate is in an indicating condition and the first counting chain stage corresponding to that gate is in a non-indicating condition, and means responsive to the successive application of two control signals to said second conductor for operating said transfer means.

18. The combination of claim 17 including means responsive to the successive application of two control signals to said first control conductor for preventing the operation of said transfer means regardless of the number of control signals thereafter appearing on said second control conductor.

19. The combination of claim 17 including resetting means, means for operating said resetting means, means responsive to the operation of said resetting means for resetting said first and second counting chains to the same setting, and means also responsive to the operation of said resetting means for restoring said transfer means to its normal unoperated condition.

References Cited in the file of this patent

UNITED STATES PATENTS

| | | |
|---|---|---|
| 2,675,538 | Malthaner | Apr. 13, 1954 |
| 2,694,801 | Bachelet | Nov. 16, 1954 |
| 2,844,309 | Ayres | July 22, 1958 |

UNITED STATES PATENT OFFICE

CERTIFICATE OF CORRECTION

Patent No. 2,932,005 April 5, 1960

Barrie Brightman

It is hereby certified that error appears in the printed specification of the above numbered patent requiring correction and that the said Letters Patent should read as corrected below.

Column 6, line 70, for "transistors" read -- transistor --; column 8, line 5, for "said plurality" read -- said first plurality --.

Signed and sealed this 11th day of October 1960.

(SEAL)

Attest:

KARL H. AXLINE
Attesting Officer

ROBERT C. WATSON
Commissioner of Patents